US012755962B2

(12) United States Patent
Kim et al.

(10) Patent No.: US 12,755,962 B2
(45) Date of Patent: Oct. 6, 2026

(54) POSITIVE ELECTRODE FOR SECONDARY BATTERY AND SECONDARY BATTERY INCLUDING THE SAME

(71) Applicant: LG Energy Solution, Ltd., Seoul (KR)

(72) Inventors: Jee-Eun Kim, Daejeon (KR); So-Ra Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 655 days.

(21) Appl. No.: 18/028,563

(22) PCT Filed: Oct. 14, 2021

(86) PCT No.: PCT/KR2021/014284
§ 371 (c)(1),
(2) Date: Mar. 27, 2023

(87) PCT Pub. No.: WO2022/080910
PCT Pub. Date: Apr. 21, 2022

(65) Prior Publication Data

US 2023/0361278 A1 Nov. 9, 2023

(30) Foreign Application Priority Data

Oct. 14, 2020 (KR) ........................ 10-2020-0132967
Dec. 29, 2020 (KR) ........................ 10-2020-0186566
Oct. 14, 2021 (KR) ........................ 10-2021-0136984

(51) Int. Cl.
*H01M 4/36* (2006.01)
*B82Y 30/00* (2011.01)
(Continued)

(52) U.S. Cl.
CPC ............. *H01M 4/366* (2013.01); *B82Y 30/00* (2013.01); *H01M 4/386* (2013.01); *H01M 4/525* (2013.01);
(Continued)

(58) Field of Classification Search
None
See application file for complete search history.

(56) References Cited

U.S. PATENT DOCUMENTS

2010/0203386 A1 8/2010 Chang et al.
2013/0171524 A1 7/2013 Cho et al.
(Continued)

FOREIGN PATENT DOCUMENTS

CN 107437610 A 12/2017
CN 107 706 351 A 2/2018
(Continued)

OTHER PUBLICATIONS

Office Action issued on Apr. 30, 2024 to Japanese Patent Application 2023-518308. Note: JP WO2015/0115052 cited therein is already of record.

(Continued)

*Primary Examiner* — Zhongqing Wei
(74) *Attorney, Agent, or Firm* — Morgan, Lewis & Bockius LLP

(57) ABSTRACT

The present disclosure relates to a positive electrode for a secondary battery. According to the present disclosure, when manufacturing a positive electrode having the same thickness, it is possible to make the binder distribution uniform in the thickness direction of the electrode active material layer by using a dual layer coating process, and to provide an effect of improving binding force by allowing the binder resin of the lower layer portion of the positive electrode active material layer to be retained in the lower layer portion. In addition, it is possible to improve the electrochemical characteristics of a battery by using a different composition of positive electrode material in the upper layer portion and the lower layer portion of the positive electrode,
(Continued)

particularly, by introducing a sacrificial positive electrode material merely to the lower layer portion.

19 Claims, 9 Drawing Sheets

(51) Int. Cl.

| | |
|---|---|
| ***H01M 4/38*** | (2006.01) |
| ***H01M 4/525*** | (2010.01) |
| ***H01M 10/0525*** | (2010.01) |
| *H01M 4/02* | (2006.01) |

(52) U.S. Cl.

CPC .. *H01M 10/0525* (2013.01); *H01M 2004/027* (2013.01); *H01M 2004/028* (2013.01)

(56) References Cited

U.S. PATENT DOCUMENTS

| | | | | |
|---|---|---|---|---|
| 2015/0372304 | A1* | 12/2015 | Hasegawa | H01M 4/131 429/231.95 |
| 2016/0351905 | A1* | 12/2016 | Kawamura | H01M 10/0525 |
| 2017/0346070 | A1 | 11/2017 | Kim et al. | |
| 2017/0352911 | A1 | 12/2017 | Choi et al. | |
| 2019/0036117 | A1* | 1/2019 | Liu | C01G 53/50 |
| 2019/0123356 | A1 | 4/2019 | Ko et al. | |
| 2019/0267614 | A1 | 8/2019 | Lee et al. | |
| 2019/0267621 | A1 | 8/2019 | Lee et al. | |
| 2019/0393507 | A1 | 12/2019 | Song et al. | |
| 2020/0006767 | A1 | 1/2020 | Du et al. | |
| 2020/0083525 | A1 | 3/2020 | Lee | |
| 2020/0106095 | A1 | 4/2020 | Nam et al. | |
| 2020/0127276 | A1* | 4/2020 | Kim | H01M 4/131 |
| 2020/0266433 | A1 | 8/2020 | Lee et al. | |
| 2020/0388852 | A1 | 12/2020 | Song et al. | |
| 2021/0167396 | A1 | 6/2021 | Kazama et al. | |
| 2021/0184257 | A1 | 6/2021 | Kim et al. | |
| 2022/0052320 | A1 | 2/2022 | Chen et al. | |
| 2022/0093912 | A1 | 3/2022 | Lee et al. | |
| 2022/0181627 | A1 | 6/2022 | Park et al. | |
| 2024/0030416 | A1 | 1/2024 | Kim et al. | |
| 2024/0186492 | A1 | 6/2024 | Kim et al. | |
| 2024/0258507 | A1 | 8/2024 | Kim et al. | |

FOREIGN PATENT DOCUMENTS

| | | | |
|---|---|---|---|
| CN | 109980199 | A | 7/2019 |
| CN | 110600704 | A | 12/2019 |
| CN | 110663126 | A | 1/2020 |
| EP | 3 396 744 | A1 | 10/2018 |
| EP | 3 641 024 | A1 | 4/2020 |
| EP | 3734720 | A1 | 11/2020 |
| JP | 2011-243345 | A | 12/2011 |
| JP | WO2015/115052 | A1 | 8/2015 |
| JP | 2018-503234 | A | 2/2018 |
| JP | 2019-061750 | A | 4/2019 |
| JP | 2019140054 | A | 8/2019 |
| JP | 2020-53315 | A | 4/2020 |
| JP | 2020-102347 | A | 7/2020 |
| KR | 10-2005-0030588 | A | 3/2005 |
| KR | 10-2013-0079109 | A | 7/2013 |
| KR | 10-2014-0137660 | A | 12/2014 |
| KR | 10-1735148 | B1 | 5/2017 |
| KR | 10-2018-0055230 | A | 5/2018 |
| KR | 10-2018-0067775 | A | 6/2018 |
| KR | 10-2019-0043955 | A | 4/2019 |
| KR | 10-2019-0047203 | A | 5/2019 |
| KR | 10-2019-0064462 | A | 6/2019 |
| KR | 10-2019-0064507 | A | 6/2019 |
| KR | 10-2019-0065147 | A | 6/2019 |
| KR | 10-2019-0073992 | A | 6/2019 |
| KR | 10-2019-0078498 | A | 7/2019 |
| KR | 10-2019-0079534 | A | 7/2019 |
| KR | 10-2020-0030473 | A | 3/2020 |
| KR | 10-2020-0034382 | A | 3/2020 |
| KR | 10-2020-0066048 | A | 6/2020 |
| WO | 2019/022422 | A1 | 1/2019 |
| WO | 2019/059655 | A2 | 3/2019 |
| WO | 2019/198351 | A1 | 10/2019 |
| WO | 2020-071814 | A1 | 4/2020 |

OTHER PUBLICATIONS

International Search Report (with partial translation) and Written Opinion dated Jan. 25, 2022, for corresponding International Patent Application No. PCT/KR2021/014284.

The extended European Search Report (EESR) dated Nov. 4, 2024, issued in corresponding EP Patent Application No. 21880557.0.

Office Action dated Oct. 15, 2024, issued in corresponding Japanese Patent Application No. 2023-518308.

Office Action dated Jan. 28, 2026 issued in the corresponding Chinese Patent Application No. 202180064449.2. (Note: EP 36056781 A1, EP 3641024 A1, and WO 2014118834 A1 already submitted.).

* cited by examiner

| | 0H | 1H | 6H | 3D | 7D |
|---|---|---|---|---|---|
| $L_6C$ | 95.9 | 84.3 | 73.2 | 63.8 | 59.9 |
| CoO | 2.4 | 2.1 | 2.0 | 1.7 | 1.7 |
| LiOH | 1.7 | 2.1 | 2.9 | 4.1 | 6.1 |
| $Co(OH)_2$ | – | 3.3 | 7.1 | 13.6 | 14.7 |
| $Li_2CO_3$ | | 8.2 | 14.8 | 16.7 | 17.5 |

POSITIVE ELECTRODE FOR SECONDARY BATTERY AND SECONDARY BATTERY INCLUDING THE SAME

TECHNICAL FIELD

The present application claims priority to Korean Patent Application No. 10-2021-0136984 filed on Oct. 14, 2021, Korean Patent Application No. 10-2020-0132967 filed on Oct. 14, 2020 and Korean Patent Application No. 10-2020-0186566 filed on Dec. 29, 2020 in the Republic of Korea. The present disclosure relates to a positive electrode for a secondary battery. The present disclosure also relates to a secondary battery including the positive electrode.

BACKGROUND ART

Secondary batteries, including lithium-ion secondary batteries, have been applied to various fields ranging from power sources of portable electronic devices, such as notebook PCs, cellular phones, digital cameras and camcorders, to electric vehicles by virtue of development of high-out and high-energy density batteries.

To improve the energy density and high-rate characteristics of such a secondary battery and to develop a high-capacity battery, there has been suggested use of a positive electrode including a Ni-enriched lithium composite oxide material and use of a negative electrode including a silicon-based (silicon and/or silicon oxide) material. In addition, when using the Ni-enriched lithium composite oxide as a positive electrode material, lithium nickel oxide (LNO, such as $Li_2NiO_2$) having high irreversible capacity is used as a sacrificial positive electrode material. However, the LNO sacrificial positive electrode material is disadvantageous in that LNO is expensive to cause an increase in production costs. In addition, there is a need for a sacrificial positive electrode material having higher charge capacity and irreversible capacity as compared to LNO.

Meanwhile, the electrode of a secondary battery is generally formed by coating electrode slurry onto an electrode current collector once. Herein, the binder contained in the electrode slurry is not dispersed homogeneously in the coated electrode active material layer but floats on the surface of the electrode active material layer. In this case, the battery shows increased resistance due to the binder to cause degradation of the battery performance undesirably. The above-mentioned problem becomes severe, as the loading amount of the electrode active material is increased. In addition, when the battery performance may be improved by localizing the electrode material at a specific portion of the electrode, such as the lower layer or the upper layer of the electrode, formation of the conventional single-layer electrode shows a limitation in realizing an effect of improving the battery performance.

Therefore, there is a need for developing an electrode having multiple electrode active material layers, each including a suitable electrode material, in order to develop a high-capacity secondary battery having increased capacity of the electrode active material and to maximize the effect of improving the performance of the secondary battery.

DISCLOSURE

Technical Problem

The present disclosure is designed to solve the problems of the related art, and therefore the present disclosure is directed to providing a positive electrode for a secondary battery including a positive electrode active material layer having a uniform binder distribution in the thickness direction. The present disclosure is also directed to providing a positive electrode for a secondary battery including multiple positive electrode active material layers, each including a suitable positive electrode active material by using a different composition of positive electrode active material in the upper layer portion and the lower layer portion of the positive electrode.

In addition, the present disclosure is directed to providing a battery including a sacrificial positive electrode material in order to supplement the irreversible capacity generated when using a Ni-enriched lithium composite oxide material as a positive electrode active material, and to reduce gas generation. Particularly, the present disclosure is directed to providing a positive electrode for a secondary battery including a sacrificial positive electrode material disposed in the lower layer portion of the positive electrode in order to prevent the sacrificial positive electrode material from being in contact with the air and being deteriorated.

Finally, the present disclosure is directed to providing a battery using single-walled carbon nanotubes (SWCNTs) as a conductive material in order to ensure the electroconductivity of a silicon-based negative electrode.

It will be easily understood that the objects and advantages of the present disclosure may be realized by the means shown in the appended claims and combinations thereof.

Technical Solution

According to the first embodiment of the present disclosure, there is provided a positive electrode for a secondary battery, which includes a positive electrode current collector and a positive electrode active material layer disposed on at least one surface of the positive electrode current collector, wherein the positive electrode active material layer includes a lower layer disposed on the surface of the current collector and an upper layer disposed on the top of the lower layer, the upper layer includes a first positive electrode active material, a conductive material and a binder resin, the lower layer includes a second positive electrode active material, a sacrificial positive electrode material, a conductive material and a binder resin, and each of the first positive electrode active material and the second positive electrode active material includes at least one selected from the compounds represented by the following Chemical Formula 1:

$$LiNi_{1-x}M_xO_2 \quad \text{[Chemical Formula 1]}$$

wherein M includes at least one of Mn, Co, Al, Cu, Fe, Mg, B and Ga, and x is 0-0.5.

According to the second embodiment of the present disclosure, there is provided the positive electrode for a secondary battery as defined in the first embodiment, wherein the sacrificial positive electrode material in the lower layer includes at least one of $Li_6CoO_4$ and a compound represented by the following Chemical Formula 2:

$$Li_6Co_{1-x}Zn_xO_4 \quad \text{[Chemical Formula 2]}$$

wherein x is 0-1.

According to the third embodiment of the present disclosure, there is provided the positive electrode for a secondary battery as defined in the first or the second embodiment, wherein the sacrificial positive electrode material includes at least one selected from $Li_6CoO_4$ and $Li_6Co_{0.7}Zn_{0.3}O_4$.

According to the fourth embodiment of the present disclosure, there is provided the positive electrode for a secondary battery as defined in any one of the first to the third embodiments, wherein the sacrificial positive electrode material is present in an amount of 1-20 wt % based on 100 wt % of the lower layer.

According to the fifth embodiment of the present disclosure, there is provided the positive electrode for a secondary battery as defined in any one of the first to the fourth embodiments, wherein the sacrificial positive electrode material is present in an amount of 10 wt % or less based on 100 wt % of the total positive electrode active material layer.

According to the sixth embodiment of the present disclosure, there is provided the positive electrode for a secondary battery as defined in any one of the first to the fifth embodiments, wherein x in Chemical Formula 1 is 0-0.15.

According to the seventh embodiment of the present disclosure, there is provided the positive electrode for a secondary battery as defined in any one of the first to the sixth embodiments, wherein M in Chemical Formula 1 includes at least two of Co, Al and Mn.

According to the eighth embodiment of the present disclosure, there is provided the positive electrode for a secondary battery as defined in any one of the first to the seventh embodiments, wherein the positive electrode active material represented by Chemical Formula 1 is $LiNi_{1-x}(Co, Mn, Al)_xO_2$, wherein Al is present at an atomic ratio of 0.001-0.02 based on Ni.

According to the ninth embodiment of the present disclosure, there is provided a lithium ion secondary battery including a positive electrode, a negative electrode, an insulating separator interposed between the positive electrode and the negative electrode, and an electrolyte, wherein the positive electrode is the same as defined in any one of the first to the eighth embodiments, the negative electrode includes a silicon-based compound as a negative electrode active material, and the conductive material includes a linear conductive material.

According to the tenth embodiment of the present disclosure, there is provided the lithium-ion secondary battery as defined in the ninth embodiment, wherein the silicon-based compound includes at least one of the compounds represented by the following Chemical Formula 3:

SiOx [Chemical Formula 3]

wherein x is equal to or more than 0 and less than 2.

According to the eleventh embodiment of the present disclosure, there is provided the lithium-ion secondary battery as defined in the tenth embodiment, wherein x is 0.5-1.5.

According to the twelfth embodiment of the present disclosure, there is provided the lithium-ion secondary battery as defined in any one of the ninth to the eleventh embodiments, wherein the linear conductive material includes at least one selected from single-walled carbon nanotubes (SWCNTs), multi-walled carbon nanotubes (MWCNTs) and graphene.

According to the thirteenth embodiment of the present disclosure, there is provided the lithium-ion secondary battery as defined in any one of the ninth to the twelfth embodiments, wherein the linear conductive material includes single-walled carbon nanotubes (SWCNTs).

Advantageous Effects

The present disclosure gives the following effects.

1) According to the present disclosure, when manufacturing a positive electrode having the same thickness, it is possible to make the binder distribution uniform in the thickness direction of the electrode active material layer by using a dual layer coating process, and to provide an effect of improving binding force by allowing the binder resin of the lower layer portion of the positive electrode active material layer to be retained in the lower layer portion.

2) It is possible to improve the electrochemical characteristics of a battery by using a different composition of positive electrode material in the upper layer portion and the lower layer portion of the positive electrode, particularly, by introducing a sacrificial positive electrode material merely to the lower layer portion.

3) In addition, the secondary battery according to the present disclosure uses lithium cobalt oxide in which cobalt is partially substituted with Zn as a sacrificial positive electrode material in the positive electrode to supplement the irreversible capacity of the battery, and the lithium cobalt oxide functions as a gas scavenger to reduce gas generation in the battery.

4) The secondary battery according to the present disclosure includes a nickel-enriched lithium composite oxide as a positive electrode active material and silicon oxide as a negative electrode active material, and thus allows the manufacture of a high-capacity battery, 5) Finally, the secondary battery according to the present disclosure uses single-walled carbon nanotubes (SWCNTs) as a negative electrode conductive material to ensure the electroconductivity of the silicon oxide-containing negative electrode to a level sufficient to operate the battery.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, shapes, sizes, scales or proportions of some constitutional elements in the drawings may be exaggerated for the purpose of clearer description.

FORMS FOR IMPLEMENTATION

Figure 1:
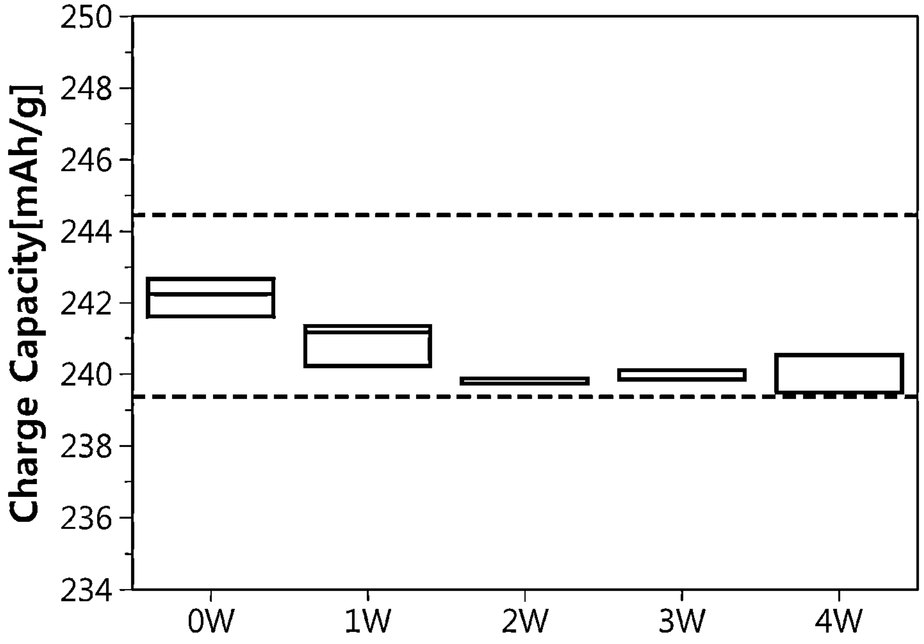
FIG. 1 is a graph illustrating the charge capacity of the battery according to Example 1 as a function of time (weeks).

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression ‘a part includes an element’ does not preclude the presence of any additional elements but means that the part may further include the other elements.

As used herein, the terms ‘about’, ‘substantially’, or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression ‘A and/or B’ means ‘A, B or both of them’.

Specific terms used in the following description are for illustrative purposes and are not limiting. Such terms as ‘right’, ‘left’, ‘top surface’ and ‘bottom surface’ show the directions in the drawings to which they are referred. Such terms as ‘inwardly’ and ‘outwardly’ show the direction toward the geometrical center of the corresponding apparatus, system and members thereof and the direction away from the same, respectively. ‘Front’, ‘rear’, ‘top’ and ‘bottom’ and related words and expressions show the positions and points in the drawings to which they are referred and should not be limiting. Such terms include the above-listed words, derivatives thereof and words having similar meanings.

In one aspect, the present disclosure relates to a positive electrode for a secondary battery. As used herein, the term ‘secondary battery’ means a device converting chemical energy into electrical energy by electrochemical reactions and is rechargeable. Particular examples of the secondary battery include a lithium-ion battery, a nickel-cadmium battery, a nickel-hydrogen battery, or the like.

According to the present disclosure, the positive electrode includes a positive electrode current collector and a positive electrode active material layer formed on at least one surface of the current collector, wherein the positive electrode active material layer includes a positive electrode active material, a conductive material and a binder resin.

According to an embodiment of the present disclosure, the positive electrode active material layer has a multilayer structure including a lower layer and an upper layer. The lower layer means a layer which is disposed on the surface of the current collector and is in contact with the current collector. In addition, the upper layer means a layer which is disposed on the surface of the lower layer and faces a separator when manufacturing a battery. According to an embodiment of the present disclosure, at least one additional electrode active material layer may be interposed between the upper layer and the lower layer.

The upper layer includes a positive electrode active material, a conductive material and a binder resin. In addition, the lower layer includes a positive electrode active material, a sacrificial positive electrode material, a conductive material and a binder resin. Preferably, the upper layer includes no sacrificial positive electrode material. In other words, in the positive electrode according to the present disclosure, the sacrificial positive electrode material is prepared in such a manner that it may not be exposed through the top layer portion of the positive electrode active material layer. According to an embodiment of the present disclosure, the additional electrode active material layer may include a sacrificial positive electrode material or not. Preferably, the additional electrode active material layer includes no sacrificial positive electrode material.

According to an embodiment of the present disclosure, the positive electrode active material includes a Ni-enriched lithium composite oxide represented by the following Chemical Formula 1:

$LiNi_{1-x}M_xO_2$ [Chemical Formula 1]

wherein M includes at least one of Mn, Co, Al, Cu, Fe, Mg, B and Ga. Preferably, M may be at least two of Co, Al and Mn. In Chemical Formula 1, x may have a value of 0-0.5, preferably 0-0.3, and more preferably, 0-0.15. According to an embodiment of the present disclosure, M may include at least one of Co, Mn and Al. According to an embodiment of the present disclosure, the positive electrode active material may be $LiNi_{1-x}(Co, Mn, Al)_xO_2$, wherein Al may be present at an atomic ratio of 0.001-0.02 based on Ni.

Preferably, the positive electrode active material layer includes the Ni-enriched lithium composite oxide in an amount of 90 wt % or more based on 100 wt % of the positive electrode active material.

According to an embodiment of the present disclosure, each of the upper layer and the lower layer independently includes the Ni-enriched lithium composite oxide in an amount of 90 wt % or more based on 100 wt % of the positive electrode active material.

If necessary, besides the Ni-enriched lithium composite oxide represented by Chemical Formula 1, the positive electrode active material may further include any one selected from: layered compounds, such as lithium manganese composite oxide ($LiMn_2O_4$, $LiMnO_2$, etc.), lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of chemical formula of $LiMn_{2-x}M_xO_2$ (wherein M is Co, Ni, Fe, Cr, Zn or Ta, and x is 0.01-0.1) or $Li_2Mn_3MO_8$ (wherein M is Fe, Co, Ni, Cu or Zn); $LiMn_2O_4$ in which Li is partially substituted with an alkaline earth metal ion; disulfide compounds; and $Fe_2(MoO_4)_3$; or a mixture of two or more of them.

The binder resin may include a PVDF-based polymer and/or acrylic polymer. According to an embodiment of the present disclosure, the PVDF-based polymer may include at least one of a copolymer of vinylidene fluoride with a copolymerizable monomer, and a mixture thereof. According to an embodiment, particular examples of the monomer include fluorinated monomers and/or chlorinated monomers. Non-limiting examples of the fluorinated monomers include at least one selected from: vinyl fluoride; trifluoroethylene (TrFE); chlorofluoroethylene (CTFE); 1,2-difluoroethylene; tetrafluoroethylene (TFE); hexafluoropropylene (HFP); perfluoro(alkylvinyl)ether, such as perfluoro(methylvinyl)ether (PMVE), perfluoro(ethylvinyl)ether (PEVE) or perfluoro(propylvinyl)ether (PPVE); perfluoro(1,3-dioxole); perfluoro(2,2-dimethyl-1,3-dioxol) (PDD); or the like, and at least one of such fluorinated monomers may be used. According to an embodiment of the present disclosure, the PVDF-based polymer may include at least one selected from polyvinylidene fluoride-co-hexafluoropropylene (PVDF-HFP), polyvinylidene fluoride-co-chlorotrifluoroethylene (PVDF-CTFE), polyvinylidene fluoride-co-tetrafluoroethylene (PVDF-TFE) and polyvinylidene fluoride-co-trifluoroethylene (PVDF-TrFE). For example, the PVDF-based polymer may include at least one selected from PVDF-HFP, PVDF-CTFE and PVDF-TFE. Preferably, the PVDF-based polymer may include at least one selected from PVDF-HFP and PVDF-CTFE. According to the present disclosure, the acrylic polymer includes a (meth)acrylic polymer. The (meth)acrylic polymer includes a (meth)acrylate as a monomer, and non-limiting examples of the monomer include butyl (meth)acrylate, 2-ethylhexyl (meth)acrylate, ethyl (meth)acrylate, methyl (meth)acrylate, n-propyl (meth)acrylate, isopropyl (meth)acrylate, t-butyl (meth)acrylate, pentyl (meth)acrylate, n-octyl (meth)acrylate, iso-octyl (meth) acrylate, isononyl (meth)acrylate, lauryl (meth)acrylate, tetradecyl (meth)acrylate, or the like, and such monomers may be used alone or in combination.

Particularly, the conductive material may include any one selected from graphite, carbon black, carbon fibers or metallic fibers, metal powder, conductive whisker, conductive metal oxide, activated carbon and polyphenylene derivatives, or a mixture of two or more of them. More particularly, the conductive material may include any one selected from the group consisting of natural graphite, artificial graphite, Super-P, acetylene black, Ketjen black, channel black, furnace black, lamp black, thermal black, denka black, aluminum powder, nickel powder, zinc oxide, potassium titanate and titanium oxide, or a mixture of two or more of such conductive materials.

The sacrificial positive electrode material functions to provide lithium that may be used for a lithium demand caused by irreversible electrochemical reaction at the negative electrode upon the initial charge. As described above, a Si-based material is used for the negative electrode in combination with a Ni-enriched lithium composite metal oxide (Ni-enriched positive electrode active material) as a positive electrode active material in order to obtain a high-capacity secondary battery. Herein, due to the irreversible electrochemical reaction at the negative electrode, such a sacrificial positive electrode material is required in order to provide lithium with ease at the positive electrode.

According to an embodiment of the present disclosure, the sacrificial positive electrode material may include a cobalt-containing lithium composite oxide in order to supplement the irreversible capacity of the Ni-enriched positive electrode active material. According to an embodiment of the present disclosure, the cobalt-containing lithium composite oxide may include at least one of $Li_6CoO_4$ and a compound represented by the following Chemical Formula 2:

$$Li_6Co_{1-x}Zn_xO_4 \quad \text{[Chemical Formula 2]}$$

wherein x may have a value of 0-1. Preferably, x is larger than 0. For example, the sacrificial positive electrode material may include at least one selected from $Li_6CoO_4$ and $Li_6Co_{0.7}Zn_{0.3}O_4$.

Figures 4, 5:
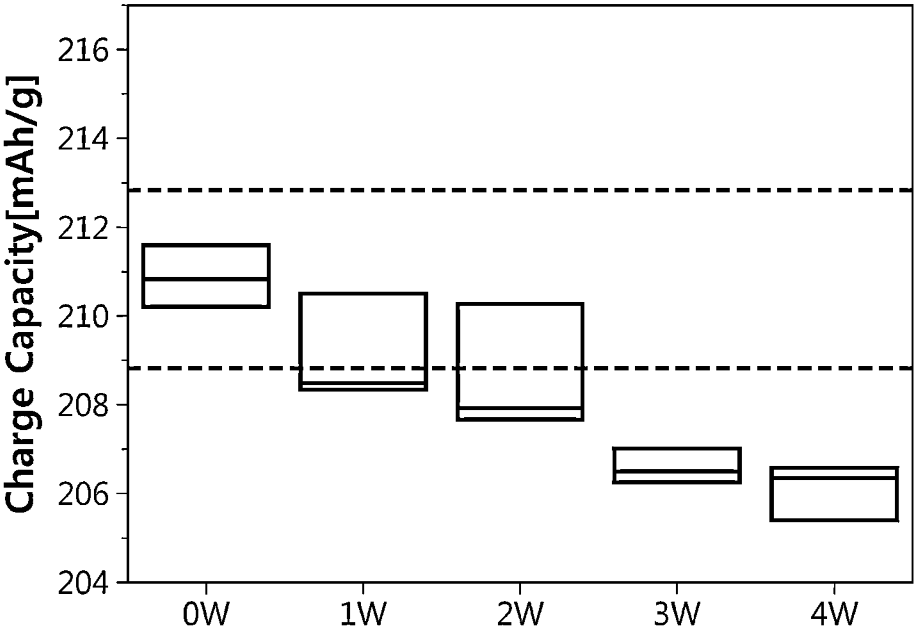
FIG. 4 is a graph illustrating the discharge capacity of the battery according to Comparative Example 1 as a function of time (weeks).
FIG. 5 and FIG. 6 illustrate a change in $Li_6CoO_4$ with time, caused by exposure to the air, decomposition and production of various byproducts.
Figure 6:
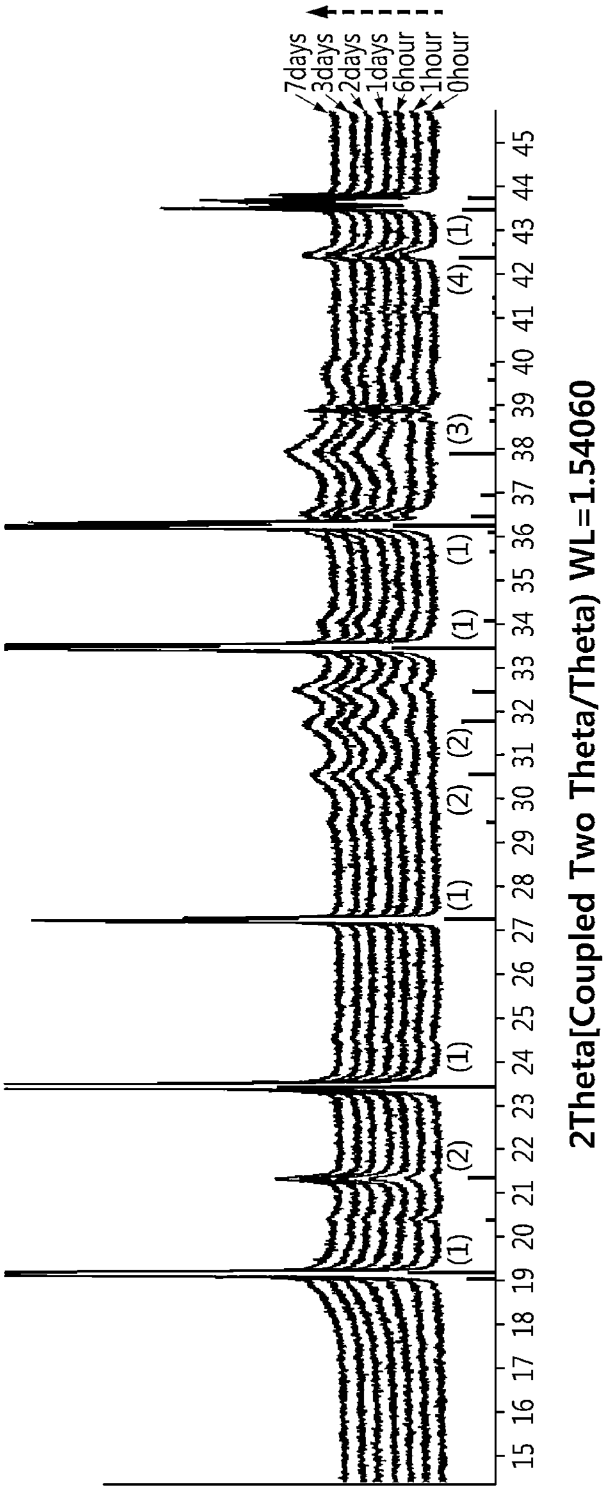

Meanwhile, the sacrificial positive electrode material easily reacts with water or carbon dioxide in the air to produce byproducts, such as $Li_6C$, CoO, LiOH, $Co(OH)_2$ and $Li_2CO_3$. Referring to FIG. 5 and FIG. 6, it can be seen that various byproducts are formed for 1-7 hours, when $Li_6CoO_4$ is allowed to stand in the air. In FIG. 5, each value is expressed in the unit of % and represents a percentage of the weight of each ingredient based on the total weight of the byproducts produced in each test run. FIG. 6 illustrates the results of Fourier Transform-Infrared Spectroscopy (FT-IR) of the byproducts. In FIG. 6, bar (1) represents $Li_6CoO_4$, bar (2) represents $Li_2CO_3$, bar (3) represents $Co(OH)_2$, and bar (4) represents CoO. This includes predominant bars in FIG. 6, and the detection result of each ingredient is also identified at a specific wavelength (WL). Herein, according to the present disclosure, the sacrificial positive electrode material is disposed in such a manner that it may not be present in the upper layer (or the uppermost layer) of the electrode active material layer and may be localized in the lower layer (or the lowermost layer) of the electrode active material layer in order to prevent the sacrificial positive electrode material from being in contact with the air.

According to an embodiment of the present disclosure, the sacrificial positive electrode material may be present in an amount of about 1-20 wt % based on 100 wt % of the lower layer. In addition, the sacrificial positive electrode material may be present in an amount of 10 wt % or less based on 100 wt % of the total positive electrode active material layer.

According to an embodiment of the present disclosure, the sacrificial positive electrode material, $Li_6CoO4$, may have a particle diameter ($D_{50}$) larger than the particle diameter ($D_{50}$) of the positive electrode active material particles. Particularly, the sacrificial positive electrode material may have a particle diameter ($D_{50}$) of 10-25 μm.

The sacrificial positive electrode material functions as a sacrificial positive electrode material capable of supplementing the irreversible capacity in the secondary battery according to an embodiment of the present disclosure, and may also function as a gas scavenger capable of reducing gas generation during the battery operation. Therefore, since the secondary battery according to an embodiment of the present disclosure includes the sacrificial positive electrode material, it is possible to prevent degradation of capacity, while reducing gas generation.

In the positive electrode active material layer, the ratio of the content of the positive electrode active material to the content of the binder resin may be 80:20-99:1 in each of the upper layer and the lower layer.

Meanwhile, in the case of the lower layer, it may include the conductive material in an amount of 0.4-1.5 wt % based on 100 wt % of the lower layer. In the case of the upper layer, it may include the conductive material in an amount of 0.4-1.0 wt % based on 100 wt % of the upper layer. In the case of the lower layer, since $LiCoO_4$ used as a sacrificial positive electrode material has a larger particle diameter and lower conductivity as compared to the positive electrode active material, it is required to increase the content of the conductive material in the lower layer as compared to that of the conductive material in the upper layer.

Meanwhile, according to an embodiment of the present disclosure, the lower layer may have a thickness of 40-60% based on 100 wt % of the total thickness of the positive electrode active material layer.

The current collector is not particularly limited, as long as it has high conductivity while not causing any chemical change in the corresponding battery. Particular examples of the current collector include stainless steel, copper, aluminum, nickel, titanium, baked carbon, or aluminum or stainless steel surface-treated with carbon, nickel, titanium, silver, or the like.

For example, the positive electrode according to the present disclosure may be obtained by forming a lower layer on one surface of a current collector, and forming an upper layer on the surface of the lower layer.

The method for manufacturing the positive electrode is not particularly limited, as long as it can prepare a positive electrode having the above-described structure.

For example, first, a suitable solvent is prepared, and a binder resin, a conductive material, a positive electrode active material and a sacrificial positive electrode material are introduced thereto to prepare slurry for a lower layer. The order of the introduction of the ingredients may be determined suitably considering the dispersibility of each ingredient. Next, the slurry for a lower layer is applied to the surface of the current collector, followed by drying. The lower layer may be formed on both surfaces of the current collector, or selectively on one surface of the current collector.

Then, an upper layer is formed on the surface of the prepared lower layer.

In the case of the upper layer, a solvent is prepared, and a binder resin, a conductive material and a positive electrode active material are introduced thereto to prepare slurry for an upper layer. The order of the introduction of the ingredients may be determined suitably considering the dispersibility of each ingredient. Next, the slurry for an upper layer is applied to the surface of the lower layer, followed by drying.

Non-limiting examples of the solvent include any one selected from the group consisting of water, acetone, tetrahydrofuran, methylene chloride, chloroform, dimethyl formamide, N-methyl-2-pyrrolidone (NMP) and cyclohexane, or a mixture of two or more of them. Then, the slurry for a lower layer is applied to the surface of the current collector.

The slurry may be coated by using a conventional coating process known to those skilled in the art, and particular examples of the coating process include various processes, such as dip coating, die coating, roll coating, comma coating, Meyer bar coating, reverse roll coating, gravure coating or a combination thereof. The slurry may be dried by using a conventional drying process, such as natural drying and air blast drying, with no particular limitation.

Meanwhile, according to an embodiment of the present disclosure, the upper layer slurry may be applied after applying the lower layer slurry and before drying the lower layer slurry, and then the upper layer and the lower layer may be introduced to a drying step at the same time.

In another aspect of the present disclosure, there is provided a secondary battery including the positive electrode. The secondary battery includes a positive electrode, a negative electrode, a separator interposed between the positive electrode and the negative electrode and an electrolyte, wherein the positive electrode has the above-described structural characteristics.

In still another aspect of the present disclosure, there are provided an electrochemical device including the positive electrode, and a secondary battery including the electrochemical device.

The secondary battery means a device converting chemical energy into electrical energy by electrochemical reactions and is rechargeable. Particular examples of the secondary battery include a lithium-ion battery, a nickel-cadmium battery, a nickel-hydrogen battery, or the like. According to the present disclosure, the secondary battery may be a lithium-ion secondary battery, preferably. Thus, the electrochemical device will be explained hereinafter by taking a lithium-ion secondary battery as an example. The lithium-ion secondary battery includes a positive electrode, a negative electrode and a separator interposed between the positive electrode and the negative electrode. The lithium-ion secondary battery now will be explained in detail with reference to each constitutional element.

According to the present disclosure, the negative electrode includes a negative electrode current collector, and a negative electrode active material layer formed on at least one surface of the current collector and containing a negative electrode active material, a conductive material and a binder resin.

According to an embodiment of the present disclosure, the negative electrode includes: a negative electrode current collector; and a negative electrode active material layer disposed on at least one surface of the negative electrode current collector. The negative electrode active material layer may include graphite and a silicon-based compound as a negative electrode active material, wherein the graphite and silicon-based compound may be used at a weight ratio of 70:30-99:1. According to an embodiment of the present disclosure, the silicon-based compound may include silicon and/or silicon oxide. According to an embodiment of the present disclosure, the silicon oxide may include at least one compound represented by the following Chemical Formula 3:

$$SiOx \qquad \text{[Chemical Formula 3]}$$

wherein $0 \le x < 2$. In the case of $SiO_2$ (x=2 in Chemical Formula 3), it does not react with lithium ions and thus cannot store lithium. Therefore, it is preferred that x is less than 2. Particularly, $0.5 \le x \le 1.5$ with a view to the structural stability of the electrode active material.

Meanwhile, according to an embodiment of the present disclosure, the silicon-based compound may further include a carbon coating layer at least partially or totally covering the surfaces of the active material particles. The carbon coating layer may function as a protective layer which inhibits the volumetric swelling of the negative electrode active material particles including the silicon-based compound and prevents side reactions with an electrolyte. The carbon coating layer may be present in an amount of 0.1-10 wt %, preferably 3-7 wt % in the silicon-based compound. Within the above-defined range, the carbon coating layer preferably prevents side reactions with an electrolyte, while controlling the volumetric swelling of the negative electrode active material particles including the silicon-based compound to a high level.

Meanwhile, according to an embodiment of the present disclosure, the negative electrode active material particles including the silicon-based compound may have a particle diameter ($D_{50}$) of 3-10 μm. When the particle diameter ($D_{50}$) is smaller than 3 μm, the negative electrode active material particles have a high specific surface area and provides an increased area for reaction with an electrolyte, thereby causing an increase in a possibility of side reaction with an electrolyte during charge/discharge, resulting in degradation of the life of a battery. On the other hand, when the particle diameter ($D_{50}$) is larger than 10 μm, the negative electrode active material particles show a large change in volume caused by volumetric swelling/shrinking so that they may be broken or cracked, resulting in the problem of deterioration and degradation of the performance of a battery.

Meanwhile, the graphite may include at least one selected from artificial graphite and natural graphite. The natural graphite may include crude natural graphite, such as crystalline graphite, flaky graphite or amorphous graphite, or spheronized natural graphite. The crystalline graphite and flaky graphite show substantially perfect crystals, and amorphous graphite shows lower crystallinity. Considering the electrode capacity, crystalline graphite and flaky graphite having high crystallinity may be used. For example, flaky graphite may be used after spheronization. In the case of spheronized natural graphite, it may have a particle diameter of 5-30 μm, preferably 10-25 μm.

Herein, in general, artificial graphite may be prepared through a graphitization process including sintering raw materials, such as coal tar, coal tar pitch and petroleum-based heavy oil, at a temperature of 2,500° C. or higher. After such graphitization, the resultant product is subjected to particle size adjustment, such as pulverization and secondary particle formation, so that it may be used as a negative electrode active material.

In general, artificial graphite includes crystals distributed randomly in particles, has a lower sphericity as compared to natural graphite and a slightly sharp shape. Such artificial graphite may be provided in a powdery shape, a flake-like shape, a block-like shape, a sheet-like shape or a rod-like shape, but preferably has an isotropic degree of orientation of crystallites so that the lithium-ion migration distance may be reduced to improve the output characteristics. Considering this, artificial graphite may have a flake-like shape and/or a sheet-like shape.

The artificial graphite used according to an embodiment of the present disclosure includes commercially available mesophase carbon microbeads (MCMB), mesophase pitch-based carbon fibers (MPCF), block-like graphitized artificial graphite, powder-like graphitized artificial graphite, or the like. The artificial graphite may have a particle diameter of 5-30 μm, preferably 10-25 μm.

The specific surface area of the artificial graphite may be determined by the BET (Brunauer-Emmett-Teller) method. For example, the specific surface area may be determined through the BET 6-point method based on nitrogen gas adsorption flow using a porosimetry analyzer (e.g. Belsorp-II mini, Bell Japan Inc.). This will be applied to the determination of the specific surface area of natural graphite as described hereinafter.

The artificial graphite may have a tap density of 0.7-1.1 g/cc, particularly 0.8-1.05 g/cc. When the tap density is less than 0.7 g/cc beyond the above-defined range, the contact area between particles is not sufficient to cause degradation of adhesion and a decrease in capacity per volume. When the tap density is larger than 1.1 g/cc, the tortuosity and electrolyte wettability of an electrode may be decreased to cause degradation of output characteristics during charge/discharge undesirably.

Herein, the tap density may be determined by using an instrument, IV-1000 available from COPLEY Co., introducing 50 g of a precursor to a 100 cc cylinder for tapping with a test instrument, SEISHIN (KYT-4000), and applying tapping thereto 3000 times. This will be applied to the determination of the tap density of natural graphite as described hereinafter.

In addition, the artificial graphite may have an average particle diameter ($D_{50}$) of 8-30 μm, particularly 12-25 μm. When the artificial graphite has an average particle diameter ($D_{50}$) of less than 8 μm, it has an increased specific surface area to cause a decrease in the initial efficiency of a secondary battery, resulting in degradation of the performance of the battery. When the average particle diameter ($D_{50}$) is larger than 30 μm, adhesion may be degraded and packing density may be reduced to cause a decrease in capacity.

For example, the average particle diameter of artificial graphite may be determined by using the laser diffraction method. The laser diffraction method generally allows determination of particle diameter ranging from the submicron region to several millimeters and provides results with high reproducibility and high resolution. The average particle diameter ($D_{50}$) of artificial graphite may be defined as the particle diameter at a point of 50% in the particle diameter distribution. For example, the average particle diameter ($D_{50}$) of artificial graphite may be determined by dispersing artificial graphite in ethanol/water solution, introducing the resultant product to a commercially available laser diffraction particle size analyzer (e.g. Microtrac MT 3000), irradiating ultrasonic waves with a frequency of about 28 kHz thereto at an output of 60 W, and calculating the average particle diameter ($D_{50}$) at a point of 50% in the particle diameter distribution determined by the analyzer. This will also be applied to the determination of the particle diameter of any ingredient other than artificial graphite.

According to an embodiment of the present disclosure, the conductive material may include any one selected from graphite, carbon black, carbon fibers or metallic fibers, metal powder, conductive whisker, conductive metal oxide, activated carbon and polyphenylene derivatives, or a mixture of two or more of them. More particularly, the conductive material may include any one selected from the group consisting of natural graphite, artificial graphite, Super-P, acetylene black, Ketjen black, channel black, furnace black, lamp black, thermal black, denka black, aluminum powder, nickel powder, zinc oxide, potassium titanate and titanium oxide, or a mixture of two or more of such conductive materials.

Particularly, according to the present disclosure, the conductive material for a negative electrode preferably includes at least one linear conductive material, such as carbon nanotubes, preferably single-walled carbon nanotubes (SWCNTs), multi-walled carbon nanotubes (MWCNTs) or graphene, which is in linear contact or surface contact, considering that the negative electrode active material includes the silicon-based compound at a high content. When the silicon-based compound is used as a negative electrode active material, the electrode capacity may be increased, but the compound shows a large change in volume due to charge/discharge to cause a high consumption of Li and formation of a thick solid electrolyte interphase (SEI) film on the surface, resulting in disconnection among the particles and isolation. Therefore, such a silicon-based compound shows a lower electrochemical efficiency as compared to carbonaceous negative electrode materials, such as graphite. Therefore, it is possible to enhance the contact among the particles of the materials, such as Si, liable to isolation and to improve the life characteristics by introducing a linear conductive material, such as SWCNT. According to an embodiment of the present disclosure, the linear conductive material may have a length of 0.5-100 μm. For example, SWCNT may have an average length of 2-100 μm, and MWCNT may have an average length of 0.5-30 μm. Meanwhile, the linear conductive material may have a sectional diameter of 1-70 nm.

The current collector is not particularly limited, as long as it has high conductivity, while not causing any chemical change in the corresponding battery. For example, stainless steel, copper, aluminum, nickel, titanium, baked carbon, or copper, aluminum or stainless steel surface-treated with carbon, nickel, titanium, silver, etc., or the like, may be used. Although the current collector is not particularly limited in its thickness, it may have a currently used thickness of 3-500 μm.

The binder resin may include a polymer used conventionally for an electrode in the art. Non-limiting examples of the binder resin include, but are not limited to: polyvinylidene fluoride-co-hexafluoropropylene, polyvinylidene fluoride-co-trichloroethylene, polymethyl methacrylate, polyethylhexyl acrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan, carboxymethyl cellulose, or the like.

The separator is not particularly limited, as long as it is used conventionally as a separator for a secondary battery. Any separator may be used with no particular limitation, as long as it has electrical insulation property, can provide an ion conduction channel and can be used as a separator for an electrochemical device in the art. For example, a porous sheet including a polymer material, such as a polymer film or nonwoven web, may be used as a separator. According to an embodiment of the present disclosure, the separator may further include a heat resistant coating layer, including inorganic particles, or the like, on the surface of the porous sheet.

The method for manufacturing an electrode assembly is not particularly limited. For example, once the positive electrode, the negative electrode and the separator are prepared, the positive electrode, separator and the negative electrode are stacked successively to prepare an electrode assembly. Then, the electrode assembly is introduced to a suitable casing, and an electrolyte is injected thereto to obtain a battery.

According to the present disclosure, the electrolyte is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone), ester compound or a mixture thereof. However, the present disclosure is not limited thereto.

In yet another aspect of the present disclosure, there are provided a battery module which includes the battery including the electrode assembly as a unit cell, a battery pack including the battery module, and a device including the battery pack as a power source. Particular examples of the device may include, but are not limited to: power tools driven by an electric motor; electric cars, including electric vehicles (EV), hybrid electric vehicles (HEV), plug-in hybrid electric vehicles (PHEV), or the like; electric carts, including electric bikes (E-bikes) and electric scooters (E-scooters); electric golf carts; electric power storage systems; or the like.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1 (Dual Layer Positive Electrode)

1) Preparation of Positive Electrode

First, a positive electrode active material ($LiNi_{0.89}Co_{0.07}Mn_{0.04}Al_{0.01}O_2$), a binder (PVDF), a conductive material (Bundle carbon CNT) and a sacrificial positive electrode material ($Li_6CoO_4$) were introduced to NMP at a weight ratio of 96.65:1.34:0.84:1.17 to prepare slurry for forming a lower positive electrode active material layer (solid content 70 wt %). The slurry was applied to aluminum foil (thickness: about 10 μm) and dried at 60° C. for 6 hours to form a lower layer of electrode active material layer. Next, a positive electrode active material ($LiNi_{0.89}Co_{0.01}Mn_{0.1}O_2$), a binder (PVDF) and a conductive material (B. CNT) were introduced to NMP at a weight ratio of 98.74:0.66:0.6 to prepare slurry for forming an upper positive electrode active material layer (solid content 70 wt %). The slurry was applied to the surface of the lower layer and dried at 60° C. for 6 hours to form an upper layer of electrode active material layer.

The ratio of the thickness of the upper electrode active material layer to that of the lower electrode active material layer was 5:5, and the total thickness of the electrode active material layer was 150 μm.

2) Manufacture of Battery

A porous film (10 μm) made of polyethylene was prepared as a separator, and the positive electrode, the separator and lithium metal were introduced to a coin cell successively, and an electrolyte was injected thereto to obtain a battery. The electrolyte was prepared by mixing ethylene carbonate, propylene carbonate, ethyl propionate and propyl propionate at a weight ratio of 2:1:2.5:4.5 and introducing $LiPF_6$ thereto at a concentration of 1.4 M.

Comparative Example 1

First, a positive electrode active material ($LiNi_{0.89}Co_{0.07}Mn_{0.04}Al_{0.01}O_2$), a binder (PVDF), a conductive material (acetylene black) and a sacrificial positive electrode material ($Li_6CoO_4$) were introduced to NMP at a weight ratio of 97.11:1.0:0.72:1.17 to prepare slurry for forming a positive electrode active material layer (solid content 70 wt %). The slurry was applied to aluminum foil (thickness: about 10 μm) and dried at 60° C. for 6 hours to prepare a positive electrode.

Next, a negative electrode was prepared in the same manner as Example 1, and a battery was obtained by using the negative electrode and the positive electrode in the same manner as Example 1.

Evaluation of Capacity Retention

Figure 2:
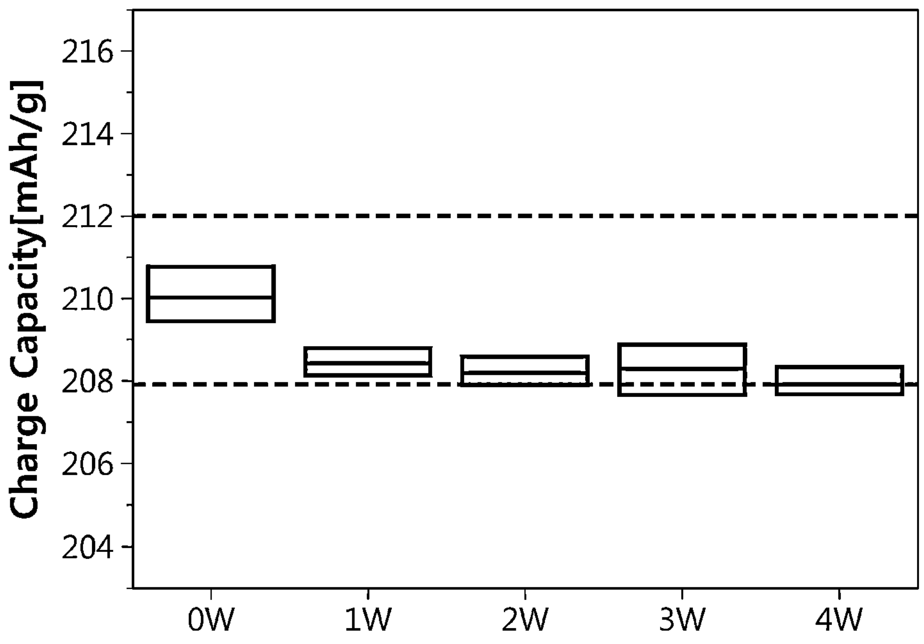
FIG. 2 is a graph illustrating the discharge capacity of the battery according to Example 1 as a function of time (weeks).
Figure 3:
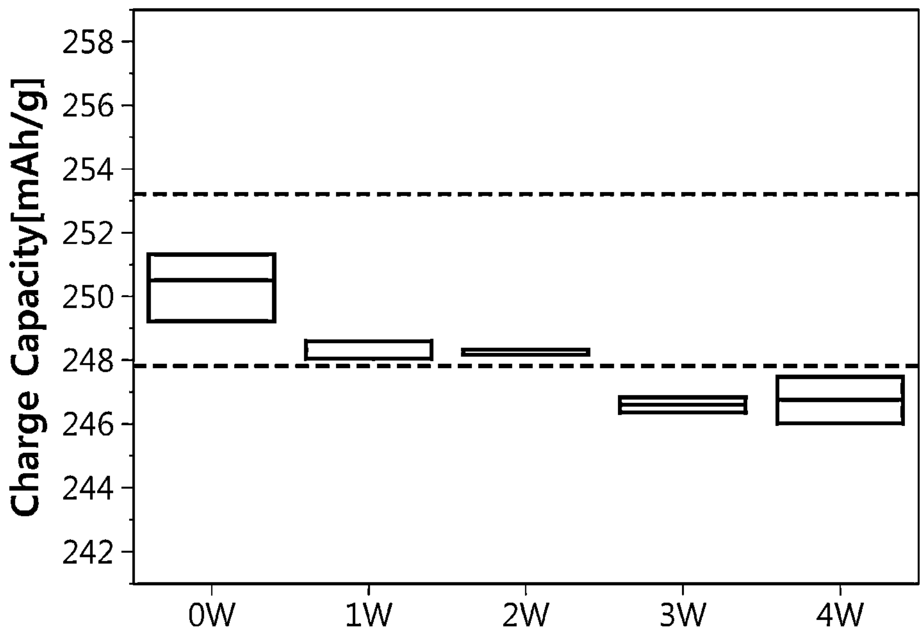
FIG. 3 is a graph illustrating the charge capacity of the battery according to Comparative Example 1 as a function of time (weeks).

Each of the batteries according to Example 1 and Comparative Example 1 was allowed to stand under a relative humidity of 10% for 4 weeks, and the charge/discharge characteristics and capacity retention of each battery was evaluated every week. The battery was charged at 0.2 C to 4.25 V in a constant current (CC)/constant voltage (CV)

mode with a cut-off current of 50 mA, discharged at 0.2 C to 2.5 V, and charge/discharge cycles were repeated under the above-mentioned conditions. The test was carried out at room temperature (25° C.). FIG. 1 and FIG. 2 are graphs illustrating the charge/discharge capacity of Example 1, and FIG. 3 and FIG. 4 are graphs illustrating the charge/discharge capacity of Comparative Example 1, wherein the charge/discharge capacity was determined right after manufacturing each battery, and while allowing each battery to stand for 1-4 weeks. Referring to FIG. 1 to FIG. 4, it can be seen that the battery according to Example 1 shows a delay in deterioration of the positive electrode and a small change in capacity during charge/discharge cycles, since the sacrificial positive electrode material is disposed in the lower layer of the electrode active material layer so that it may be prevented from being in contact with water.

Meanwhile, the following Table 1 shows a change in water content and $Li_2CO_3$ content in the positive electrode active material layer, as determined by allowing each of the positive electrodes obtained from Example 1 and Comparative Example 1 under a relative humidity of 10% for 4 weeks. It can be seen from Table 1 that the positive electrode according to Example 1 shows a smaller water content and $Li_2CO_3$ content and a lower increment with time, as compared to the positive electrode according to Comparative Example 1.

TABLE 1

| | Example 1 | | | Comparative Example 1 | | |
|---|---|---|---|---|---|---|
| | Water | $Li_2CO_3$ content | | Water | $Li_2CO_3$ content | |
| | ppm | ppm | % | ppm | ppm | % |
| O day | 100.3 | 0.22 | 100 | 98.7 | 0.23 | 100 |
| 2 weeks | 251.1 | 0.45 | 205 | 298.0 | 0.51 | 222 |
| 4 weeks | 310.2 | 0.49 | 223 | 388.4 | 0.64 | 278 |

Example 2-1

1) Preparation of Positive Electrode

First, a positive electrode active material ($LiNi_{0.89}Co_{0.01}Mn_{0.1}O_2$), a binder (PVDF), a conductive material (acetylene black) and a sacrificial positive electrode material ($Li_6CoO_4$) were introduced to NMP at a weight ratio of 97.00:1.12:0.60:1.28 to prepare slurry for forming a lower positive electrode active material layer (solid content 70 wt %). The slurry was applied to aluminum foil (thickness: about 10 μm) and dried at 60° C. for 6 hours to form a lower layer of electrode active material layer. Next, a positive electrode active material ($LiNi_{0.89}Co_{0.01}Mn_{0.1}O_2$), a binder (PVDF) and a conductive material (acetylene black) were introduced to NMP at a weight ratio of 98.74:0.66:0.6 to prepare slurry for forming an upper positive electrode active material layer (solid content 70 wt %). The slurry was applied to the surface of the lower layer and dried at 60° C. for 6 hours to form an upper layer of electrode active material layer.

2) Preparation of Negative Electrode

A negative electrode active material, a binder (PVDF), a conductive material (single-walled carbon nanotubes, LG Chem.) and a thickener (carboxymethyl cellulose, CMC) were introduced to NMP at a weight ratio of 97.78:1.15:0.12:0.95 to prepare slurry for forming a negative electrode active material layer (solid content 45 wt %). The negative electrode active material was a mixture containing artificial graphite ($D_{50}$: about 15 μm, specific surface area: about 0.9 $m^2/g$) and Si ($D_{50}$: about 6 μm, specific surface area: about 6 $m^2/g$) at a weight ratio of 90:10. The slurry was applied to copper foil (thickness: about 10 μm) and dried at 60° C. for 6 hours to prepare a negative electrode.

3) Manufacture of Battery

A porous film (10 μm) made of polyethylene was prepared as a separator, and a lamination process including stacking the positive electrode, the separator and lithium metal successively and pressurizing them at 80° C. was carried out to obtain an electrode assembly. The electrode assembly was introduced to a 18650-size cylindrical metal can (0.2 C capacity 3.0 Ah standard), and an electrolyte was injected thereto to obtain a battery. The electrolyte was prepared by mixing ethylene carbonate, propylene carbonate, ethyl propionate and propyl propionate at a weight ratio of 2:1:2.5:4.5 and introducing $LiPF_6$ thereto at a concentration of 1.4 M.

Example 2-2

A battery was obtained in the same manner as Example 2-1, except that $Li_6Co_{0.7}Zn_{0.3}O_4$ was used as a sacrificial positive electrode material of the lower layer of the positive electrode active material layer, instead of $Li_6CoO_4$.

Comparative Example 2

1) Preparation of Positive Electrode

First, a positive electrode active material ($LiNi_{0.89}Co_{0.01}Mn_{0.1}O_2$), a binder (PVDF), a conductive material (acetylene black) and a sacrificial positive electrode material ($Li_2CoO_2$) were introduced to NMP at a weight ratio of 94.28:1.12:0.60:4.0 to prepare slurry for forming a lower positive electrode active material layer (solid content 70 wt %). The slurry was applied to aluminum foil (thickness: about 10 μm) and dried at 60° C. for 6 hours to form a lower layer of electrode active material layer. Next, a positive electrode active material ($LiNi_{0.89}Co_{0.01}Mn_{0.1}O_2$), a binder (PVDF) and a conductive material (acetylene black) were introduced to NMP at a weight ratio of 98.74:0.66:0.6 to prepare slurry for forming an upper positive electrode active material layer (solid content 70 wt %). The slurry was applied to the surface of the lower layer and dried at 60° C. for 6 hours to form an upper layer of electrode active material layer.

2) Preparation of Negative Electrode

A negative electrode active material, a binder (PVDF), a conductive material (multi-walled carbon nanotubes, LG Chem.) and a thickener (carboxymethyl cellulose, CMC) were introduced to NMP at a weight ratio of 97.4:1.15:0.5:0.95 to prepare slurry for forming a negative electrode active material layer (solid content 45 wt %). The negative electrode active material was a mixture containing artificial graphite ($D_{50}$: about 15 μm, specific surface area: about 0.9 $m^2/g$) and Si ($D_{50}$: about 6 μm, specific surface area: about 6 $m^2/g$) at a weight ratio of 90:10. The slurry was applied to copper foil (thickness: about 10 μm) and dried at 60° C. for 6 hours to prepare a negative electrode.

3) Manufacture of Battery

A battery was obtained in the same manner as Example 2-1.

Comparative Example 3

1) Preparation of Positive Electrode

A positive electrode was prepared in the same manner as Comparative Example 2.

2) Preparation of Negative Electrode

A negative electrode active material, a binder (PVDF), a conductive material (single-walled carbon nanotubes, LG Chem.) and a thickener (carboxymethyl cellulose, CMC) were introduced to NMP at a weight ratio of 97.78:1.15:0.12:0.95 to prepare slurry for forming a negative electrode active material layer (solid content 45 wt %). The negative electrode active material was a mixture containing artificial graphite ($D_{50}$: about 15-16 μm, specific surface area: about 0.9 $m^2/g$) and Si ($D_{50}$: about 6 μm, specific surface area: about 6 $m^2/g$) at a weight ratio of 90:10. The slurry was applied to copper foil (thickness: about 10 μm) and dried at 60° C. for 6 hours to prepare a negative electrode.

3) Manufacture of Battery

A battery was obtained in the same manner as Example 1.

Example 3

1) Preparation of Positive Electrode

First, a positive electrode active material, a binder (polyvinylidene fluoride, PVDF), a conductive material (acetylene black) and a sacrificial positive electrode material ($LiCo_6O_2$) were introduced to NMP at a weight ratio of 97.00:1.12:0.6:1.28 to prepare slurry for forming a lower positive electrode active material layer (solid content 70 wt %). The slurry was applied to aluminum foil (thickness: about 10 μm) and dried at 60° C. for 6 hours to form a lower layer of electrode active material layer. Next, a positive electrode active material, a binder (PVDF) and a conductive material (acetylene black) were introduced to NMP at a weight ratio of 98.74:0.66:0.6 to prepare slurry for forming an upper positive electrode active material layer (solid content 70 wt %). The slurry was applied to the surface of the lower layer and dried at 60° C. for 6 hours to form an upper layer of electrode active material layer.

The positive electrode active material was a mixture containing $LiNi_{0.89}Co_{0.01}Mn_{0.1}O_2$ and $Li_2NiO_2$ at a weight ratio of about 95:5.

2) Preparation of Negative Electrode

A negative electrode active material, a binder (PVDF), a conductive material (single-walled carbon nanotubes, LG Chem.) and a thickener (carboxymethyl cellulose, CMC) were introduced to NMP at a weight ratio of 97.78:1.15:0.12:0.95 to prepare slurry for forming a negative electrode active material layer (solid content 70 wt %). The slurry was applied to copper foil (thickness: about 10 μm) and dried at 60° C. for 6 hours to prepare a negative electrode. The negative electrode active material was a mixture containing artificial graphite ($D_{50}$: about 15-16 μm, specific surface area: about 0.9 $m^2/g$) and Si ($D_{50}$: about 6 μm, specific surface area: about 6 $m^2/g$) at a weight ratio of 84:16.

3) Manufacture of Battery

A porous film (10 μm) made of polyethylene was prepared as a separator, and a lamination process including stacking the positive electrode, the separator and the negative electrode successively and pressurizing them at 80° C. was carried out to obtain an electrode assembly. The electrode assembly was introduced to a 21700-size cylindrical metal can (0.2 C capacity 5.0 Ah standard), and an electrolyte was injected thereto to obtain a battery. The electrolyte was prepared by mixing ethylene carbonate, propylene carbonate, ethyl propionate and propyl propionate at a weight ratio of 2:1:2.5:4.5 and introducing $LiPF_6$ thereto at a concentration of 1.4 M.

Comparative Example 4

1) Preparation of Positive Electrode

First, a positive electrode active material, a binder (polyvinylidene fluoride, PVDF) and a conductive material (acetylene black) were introduced to NMP at a weight ratio of 98.28:1.12:0.6 to prepare slurry for forming a lower positive electrode active material layer (solid content 70 wt %). The slurry was applied to aluminum foil (thickness: about 10 μm) and dried at 60° C. for 6 hours to form a lower layer of electrode active material layer. The positive electrode active material was a mixture containing $LiNi_{0.89}Co_{0.01}Mn_{0.1}O_2$ and $Li_2NiO_2$ at a weight ratio of about 95:5. Next, a positive electrode active material ($LiNi_{0.89}Co_{0.01}Mn_{0.1}O_2$), a binder (PVDF) and a conductive material (acetylene black) were introduced to NMP at a weight ratio of 98.74:0.66:0.6 to prepare slurry for forming an upper positive electrode active material layer (solid content 70 wt %). The slurry was applied to the surface of the lower layer and dried at 60° C. for 6 hours to form an upper layer of electrode active material layer.

2) Preparation of Negative Electrode

A negative electrode active material, a binder (PVDF), a conductive material (single-walled carbon nanotubes, LG Chem.) and a thickener (carboxymethyl cellulose, CMC) were introduced to NMP at a weight ratio of 97.78:1.15:0.12:0.95 to prepare slurry for forming a negative electrode active material layer (solid content 70 wt %). The slurry was applied to copper foil (thickness: about 10 μm) and dried at 60° C. for 6 hours to prepare a negative electrode. The negative electrode active material was a mixture containing artificial graphite ($D_{50}$: about 15-16 μm, specific surface area: about 0.9 $m^2/g$) and Si ($D_{50}$: about 6 μm, specific surface area: about 6 $m^2/g$) at a weight ratio of 90:10.

3) Manufacture of Battery

A battery was obtained in the same manner as Example 2.

Comparative Example 5

1) Preparation of Positive Electrode

First, a positive electrode active material, a binder (polyvinylidene fluoride, PVDF) and a conductive material (acetylene black) were introduced to NMP at a weight ratio of 98.28:1.12:0.6 to prepare slurry for forming a positive electrode active material layer (solid content 70 wt %). The slurry was applied to aluminum foil (thickness: about 10 μm) and dried at 60° C. for 6 hours to form a lower layer of electrode active material layer. The positive electrode active material was a mixture containing $LiNi_{0.89}Co_{0.01}Mn_{0.1}O_2$ and $Li_2NiO_2$ at a weight ratio of about 95:5. Next, a positive electrode active material ($LiNi_{0.89}Co_{0.01}Mn_{0.1}O_2$), a binder (polyvinylidene fluoride, PVDF) and a conductive material (acetylene black) were introduced to NMP at a weight ratio of 98.28:1.12:0.6 to prepare slurry for forming a positive electrode active material layer (solid content 70 wt %). The slurry was applied to aluminum foil (thickness: about 10 μm) and dried at 60° C. for 6 hours to form a lower layer of electrode active material layer.

2) Preparation of Negative Electrode

A negative electrode active material, a binder (PVDF), a conductive material (multi-walled carbon nanotubes, LG Chem.) and a thickener (carboxymethyl cellulose, CMC) were introduced to NMP at a weight ratio of 97.78:1.15:0.12:0.95 to prepare slurry for forming a negative electrode active material layer (solid content 70 wt %). The slurry was applied to copper foil (thickness: about 10 μm) and dried at 60° C. for 6 hours to prepare a negative electrode. The negative electrode active material was a mixture containing artificial graphite ($D_{50}$: about 15-16 μm, specific surface area: about 0.9 $m^2/g$) and Si ($D_{50}$: about 6 μm, specific surface area: about 6 $m^2/g$) at a weight ratio of 90:10.

3) Manufacture of Battery

A battery was obtained in the same manner as Example 2.

(3) Evaluation of Capacity Retention

1) Test 1

Figure 7:
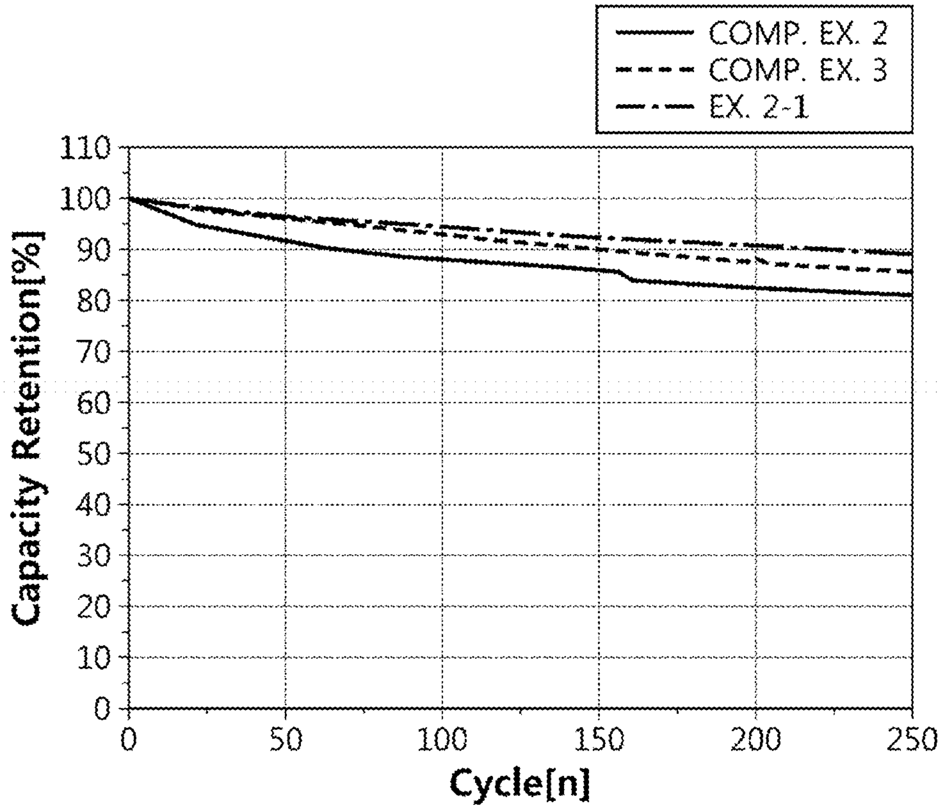
FIG. 7 is a graph illustrating the capacity retention of each of Example 2-1 and Comparative Examples 2 and 3 depending on cycle number.
Figure 8:
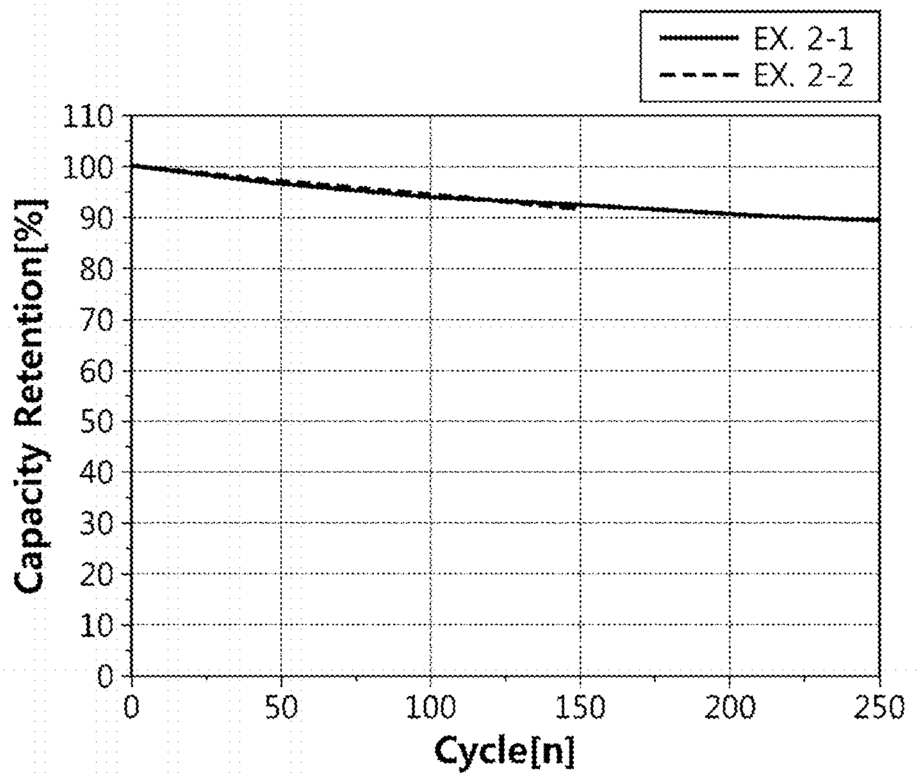
FIG. 8 is a graph illustrating the capacity retention of each of Example 2-1 and Example 2-2 depending on cycle number.

Each of the batteries according to Examples 2-1 and 2-2 and Comparative Examples 2 and 3 was charged/discharged, and the capacity retention was evaluated. Each battery was charged at 3 A to 4.2 V in a constant current (CC)/constant voltage (CV) mode with a cut-off current of 50 mA, discharged at 10 A to 2.5 V, and charge/discharge cycles were repeated under the above-mentioned conditions. The test was carried out at room temperature (25° C.). The results are shown in FIG. 7. It can be seen that, in the case of the battery according to Example 2-1, it shows a higher capacity retention as compared to the batteries according to Comparative Example 2 and Comparative Example 3. Meanwhile, it can be seen from FIG. 8 that the capacity retention of the battery according to Example 2-2 is the same as the capacity retention of the battery according to Example 2-1.

2) Test 2

Figure 9:
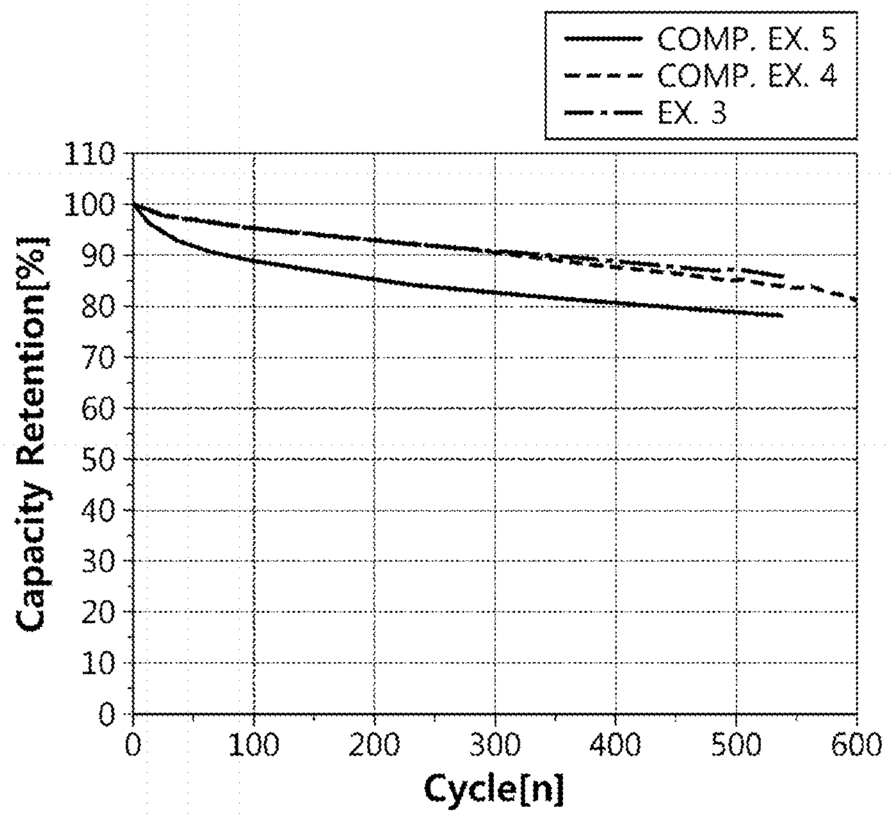
FIG. 9 to FIG. 11 are graphs illustrating the capacity retention of each of Example 3 and Comparative Examples 4 and 5 depending on C-rate and cycle number.
Figure 10:
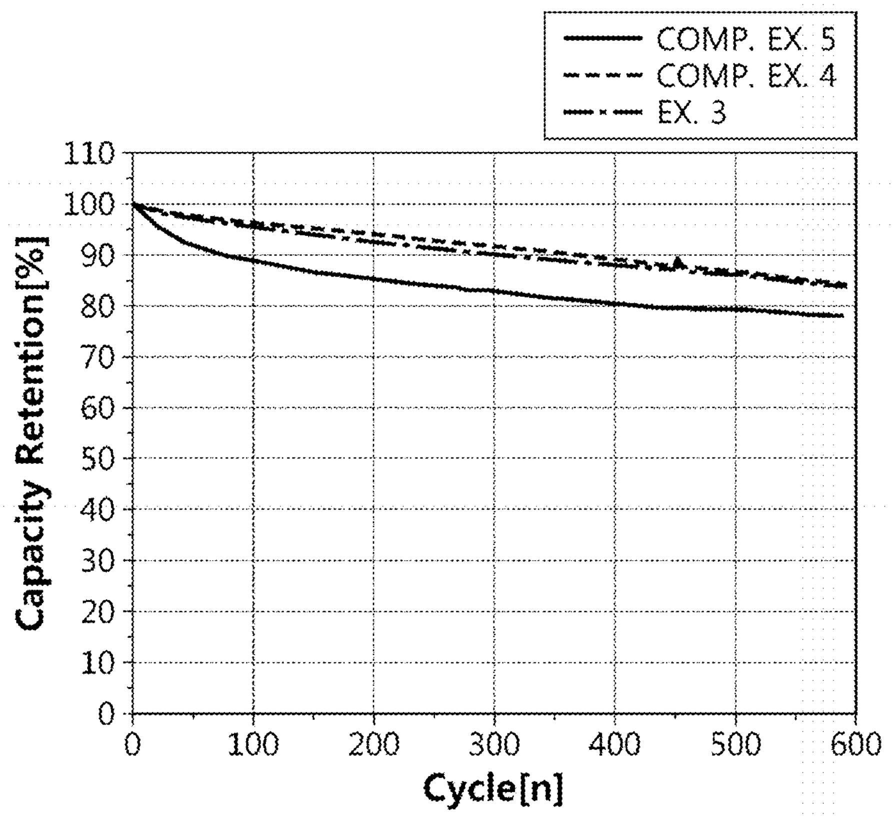
Figure 11:
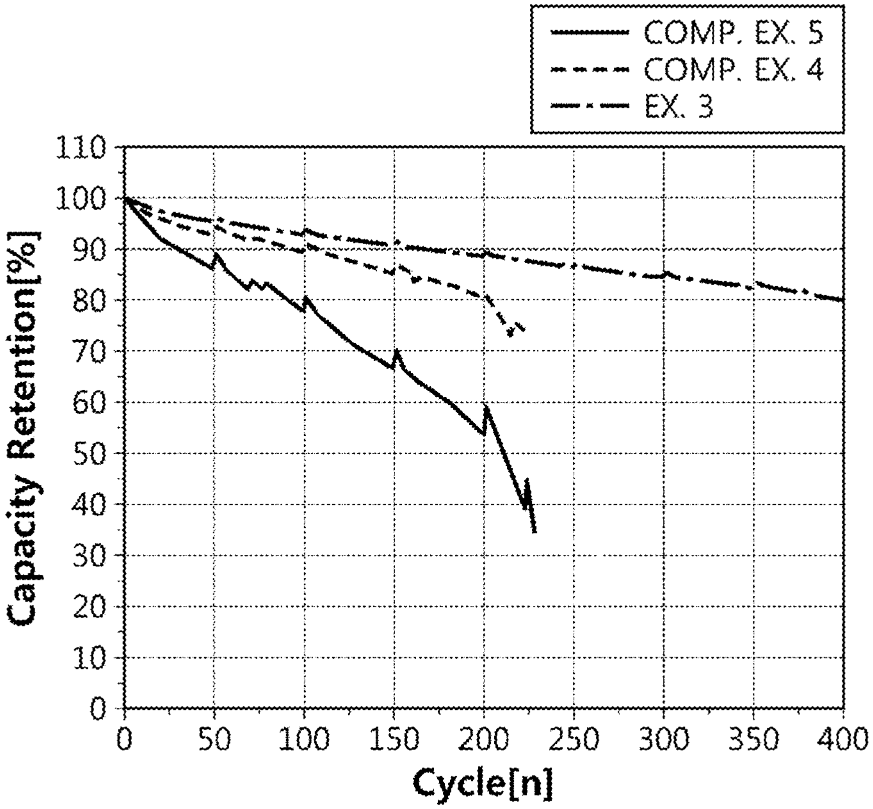

Each of the batteries according to Example 3 and Comparative Examples 4 and 5 was charged/discharged, and the capacity retention was evaluated. Each battery was charged at 3 A to 4.2 V in a constant current (CC)/constant voltage (CV) mode with a cut-off current of 50 mA, discharged at each of 10 A, 20 A and 30 A to 2.5 V, and charge/discharge cycles were repeated under the above-mentioned conditions. The test was carried out at room temperature. The results are shown in FIG. 9 to FIG. 11. FIG. 9 illustrates the results obtained after discharging each battery at 10 A. FIG. 10 illustrates the results obtained after discharging each battery at 20 A. FIG. 11 illustrates the results obtained after discharging each battery at 30 A. As can be seen from FIG. 9 to FIG. 11, in the case of the battery according to Example 3, it shows a higher capacity retention as compared to the batteries according to Comparative Examples 4 and 5.

What is claimed is:

1. A positive electrode for a secondary battery comprising:
- a positive electrode current collector, and
- a positive electrode active material layer disposed on at least one surface of the positive electrode current collector, the positive electrode active material layer comprising:
  - a lower layer disposed on the surface of the positive electrode current collector, and
  - an upper layer disposed on a top of the lower layer, the upper layer comprising:
    - a first positive electrode active material,
    - a first conductive material, and
    - a first binder resin,
  - the lower layer comprising:
    - a second positive electrode active material,
    - a sacrificial positive electrode material,
    - a second conductive material, and
    - a second binder resin, and
  - each of the first positive electrode active material and the second positive electrode active material independently comprises at least one compound represented by Chemical Formula 1;

$LiNi_{1-x}M_xO_2$ [Chemical Formula 1]

- wherein M includes at least one of Mn, Co, Al, Cu, Fe, Mg, B, and Ga, and x is 0-0.5,
- wherein the sacrificial positive electrode material is absent from the upper layer, and
- wherein the sacrificial positive electrode material in the lower layer comprises at least one compound represented by Chemical Formula 2:

$Li_6Co_{1-x}Zn_xO_4$ [Chemical Formula 2]

wherein x is 0-1.

2. The positive electrode for a secondary battery according to claim 1, wherein the at least one compound represented by the Chemical Formula 2 comprises $Li_6CoO_4$, $Li_6Co_{0.7}Zn_{0.3}O_4$, or both.

3. The positive electrode for a secondary battery according to claim 1, wherein the sacrificial positive electrode material is present in an amount of 1-20 wt % based on 100 wt % of the lower layer.

4. The positive electrode for a secondary battery according to claim 1, wherein the sacrificial positive electrode material is present in an amount of 10 wt % or less based on 100 wt % in total of the positive electrode active material layer.

5. The positive electrode for a secondary battery according to claim 1, wherein x in the Chemical Formula 1 is 0-0.15.

6. The positive electrode for a secondary battery according to claim 1, wherein M in the Chemical Formula 1 includes at least two selected from the group consisting of Co, Al and Mn.

7. The positive electrode for a secondary battery according to claim 1, wherein the at least one compound represented by the Chemical Formula 1 is $LiNi_{1-x}(Co, Mn, Al)_xO_2$, wherein Al is present at an atomic ratio of 0.001-0.02 based on Ni.

8. A lithium-ion secondary battery comprising:

the positive electrode according to claim 1, a negative electrode comprising:

a negative electrode active material including a silicon-based compound, and a third conductive material comprising a linear conductive material, an insulating separator interposed between the positive electrode and the negative electrode, and an electrolyte.

9. The lithium-ion secondary battery according to claim 8, wherein the silicon-based compound comprises at least one compound represented by Chemical Formula 3:

SiOx [Chemical Formula 3]

wherein x is equal to or more than 0 and less than 2.

10. The lithium-ion secondary battery according to claim 9, wherein x in the Chemical Formula 3 is 0.5-1.5.

11. The lithium-ion secondary battery according to claim 8, wherein the linear conductive material comprises at least one selected from the group consisting of single-walled carbon nanotubes (SWCNTs) and multi-walled carbon nanotubes (MWCNTs).

12. The lithium-ion secondary battery according to claim 8, wherein the linear conductive material comprises single-walled carbon nanotubes (SWCNTs).

13. The positive electrode for a secondary battery according to claim 1, wherein the first positive electrode active material and the second positive electrode active material are the same.

14. The positive electrode for a secondary battery according to claim 1, wherein the at least one compound represented by the Chemical Formula 1 is $LiNi_{1-x}(Co, Mn, Al)_xO_2$, wherein Al is present at an atomic ratio of 0.01-0.02 based on Ni.

15. The positive electrode for a secondary battery according to claim 1, wherein the sacrificial positive electrode material comprises $Li_6CoO_4$.

16. The positive electrode for a secondary battery according to claim 1, wherein the sacrificial positive electrode material comprises $Li_6Co_{0.7}Zn_{0.3}O_4$.

17. The positive electrode for a secondary battery according to claim 1, wherein the sacrificial positive electrode material is present in an amount of 1.28 wt % or less based on 100 wt % in total of the positive electrode active material layer.

18. The positive electrode for a secondary battery according to claim 1, wherein the first binder resin, the second binder resin, or both of the first binder resin and the second binder resin include polyvinylidene fluoride, wherein the first conductive material, the second conductive material, or both of the first conductive material and the conductive material include acetylene black, and wherein the first positive electrode active material, the second positive electrode active material, or both of the first positive electrode active material and the second positive electrode active material include $Li_2NiO_2$.

19. The lithium-ion secondary battery according to claim 8, wherein the third conductive material comprises graphene.

* * * * *